United States Patent [19]

Werding

[11] Patent Number: 4,487,334
[45] Date of Patent: Dec. 11, 1984

[54] THRUST CONTROL MEANS MOUNTABLE IN A PRESSURIZED CONTAINER

[76] Inventor: Winfried J. Werding, 77, Av. du Général Guisan, 1009 Pully, Switzerland

[21] Appl. No.: 369,023
[22] PCT Filed: Aug. 6, 1981
[86] PCT No.: PCT/CH81/00089
 § 371 Date: Apr. 5, 1982
 § 102(e) Date: Aug. 5, 1982
[87] PCT Pub. No.: WO82/00450
 PCT Pub. Date: Feb. 18, 1982

[30] Foreign Application Priority Data
 Aug. 6, 1980 [CH] Switzerland .............. 5939/80

[51] Int. Cl.³ .............................. B67D 5/34
[52] U.S. Cl. ........................ 222/55; 222/61; 222/394; 222/396
[58] Field of Search ........................ 222/3-4, 222/55, 61-62, 394, 396, 402.1, 464; 239/574; 137/81.1, 209, 206

[56] References Cited
FOREIGN PATENT DOCUMENTS

| | | | |
|---|---|---|---|
| 700281 | 12/1964 | Canada | .............. 222/464 |
| 1089772 | 3/1955 | France . | |
| 507783 | 6/1939 | United Kingdom . | |
| 831469 | 3/1960 | United Kingdom . | |

*Primary Examiner*—Charles A. Marmor
*Attorney, Agent, or Firm*—Heinrich W. Herzfeld

[57] ABSTRACT

By the displacement, depending on the pressure change in the container (22), of a piston (8) in order to open or obturate a bore (9) in the product conduit (7), the amount of product flowing per unit of time through the opened valve (1) is maintained constant even when the pressure in the container (22) diminishes. The piston (8) is so displaced by the pressure prevailing in the container (22) via a diaphragm (12) against a restoring force (21) that the bore (9) defines, at the time of the highest pressure prevailing in the container (22), a smallest predetermined opening for the product flow. By an adequate choice of the shape of the bore (9), the thrust of the product flowing through the opened valve (1) can thereby be maintained constant, which leads to a constant quality of atomization of the product (23) through a spray nozzle.

17 Claims, 9 Drawing Figures

THRUST CONTROL MEANS MOUNTABLE IN A PRESSURIZED CONTAINER

The present invention relates to thrust control means, for use in the interior of a container under gas pressure, by means of which the amount, per unit of time, of product dischargeable from the container can be maintained at least approximately constant during the entire discharge time in spite of the internal pressure decreasing as the container is increasingly emptied.

The prohibition of aerosol cans which use chlorofluorinated hydrocarbons as propellant is, in various countries, the answer to the danger which these gases present to the protective ozone layer which encloses the Earth.

Practically half the number of sold spray cans has always been filled with a mixture of propane and butane gas which are no danger for the ozone layer as they are previously decomposed. However, as this propellant gas mixture is extremely combustible and explosive, at least 55% of the content of the spray can must be non-combustible due to the use of water, trichloroethane or methylene chloride.

In many countries, trichloroethane and methylene chloride are permitted for cosmetic products only in an amount of up to 35% of the product, and, as they can lead to a dangerous hydrolysis with water, the missing 20% of the non-combustible share cannot consist of water. To use only water as the non-combustible share would substantially decrease the quality of the cosmetic product, quite apart from the fact that water and propane/butane must be mixed by means of an emulsifier to form an emulsion, which requires shaking of the spray can before each use. In order to avoid that, after discharge of the non-inflammable portion, there remains in the spray can a pure, highly dangerous propellant gas mixture, but also, in order for the discharged aqueous product to contain a sufficiently large amount of propellant gas which, at detensioning in air, will disperse the water as fine droplets, whereby a sufficiently rapid vaporization is attained. As, however, the emulsifiers mostly contain oils and waxes, the expelled aqueous product has a smudgy character. It is therefore practically impossible to sell a water-based hair lacquer in countries such as Japan, England, Sweden etc., which have a humid climate, because the water-soluble resins of the hair lacquer cannot preserve the hairdo in humid weather.

One has tried to use carbon dioxide, nitrogen or laughing gas, or simply compressed air as propellant. However, in order to achieve an atomization quality which is acceptable up to complete emptying, and a constant discharge volume per second, new agents must be found, for these inert gases show a pressure drop which is directly proportional to the increasing empty volume of a spray can by the discharge of the product contents, which, however, does not permit maintaining constant the atomization quality of a conventional atomizer; it will become continuously worse during emptying, apart from the fact that the product discharge volume per unit of times becomes continuously smaller.

The applicant of the instant invention has developed a spray nozzle which has been described in the German Offenlegungsschrift No. 28 26 784 of Feb. 15th, 1979 under the designation of "Spray nozzle and device containing a spray nozzle and processes for their manufacture". Thanks to this spray nozzle it is possible to attain a good atomization quality with substantially lower pressure values than have been hitherto conventional, which means that the initial pressure of the spray can filled with inert gases, may lie at about 6 bar instead of 10 bar, because the above-mentioned spray nozzle releases an acceptable spray quality even at a terminal pressure of about 2 bar, especially, if the product involves an ethanol-methylene chloride mixture. If a higher initial pressure, for instance of 10.5 bar, is used, then the spray nozzle ejects a spray cloud of the finest particle size.

The above-mentioned spray nozzle can solve the problem of atomization from spray cans with inert gases as propellant only partially inasmuch as it has no influence at all on the unavoidable decrease of the product discharge rate per unit of time.

It is therefore a task of the present invention to overcome the drawbacks mentioned hereinbefore of conventional spray cans, and to provide means which are capable of maintaining the amount of product discharge per unit of time constant, of achieving the atomization quality of liquid propellant-filled spray cans most closely with inert, not dangerous gases, and of placing at the disposal of the consumer an aerosol can which may be used like the conventional ones, without possessing their drawbacks, and which, on account of its practical handling and comfort, he would not like to dispense with.

In accordance with the invention, this task is solved by thrust control means which is characterized in that it possesses, in a product channel, a transverse bore in which there is lodged transversely displaceably a plunger, with a bore having an axis which is at least approximately parallel with the axis of the product channel, in such a manner that it is so displaced, transversely to the product channel against a restoring element, by means of a membrane, one side of which is acted upon by the pressure in the container, that it assumes at a pressure exceeding a predetermined maximal value in the container, a first end position in which it reduces, through the bore, the product channel within the zone of the transverse bore down to a predetermined minimum cross section, and, proportionally to the pressure which is diminished in the container by the latter being emptied, increases the cross section of the product channel in the zone of the transverse bore, up to a predetermined cross section, by means of a displacement until reaching a second end position, in such a manner that this second end position is reached when a predetermined minimum pressure has been attained in the container, and that the shape of the bore depending on the shape of the product channel and on the displacement of the plunger, brought about by the pressure changes in the container, transversely to the axis of the product channel, is such that the total of the pressure in the container times the cross section of the product channel within the range of the plunger remains at least approximately constant even at changing pressure.

In an advantageous embodiment of the control means, it is provided that the transverse bore and piston are out of round so that the latter is protected against turning.

Details of the invention are described hereinafter at the hand of advantageous embodiment as illustrated in the drawing, but having no limitative character. In the drawing, there show:

FIG. 1 a section of a thrust control means according to the invention prior to generating pressure in the container, FIG. 2 a section through the embodiment of the invention according to FIG. 1, when it is under pressure, FIG. 3 a view from above, partially in section, of a thrust control means according to the invention being subject to pressure, FIG. 4 a view, partially in section, along A—A in FIG. 3, FIG. 4A a section through the left-hand portion of a thrust control means similar to that shown in FIG. 1, but equipped with a restoring spring, FIG. 5 a partial section through another advantageous embodiment of the thrust control means according to the invention, FIG. 6 a section through a further advantageous embodiment of the thrust control means according to the invention, with an additional safety valve, FIG. 7 a section through an extremely advantageous embodiment of the thrust control means according to the invention, at the free end of a riser tube immersed in a product, and FIG. 8 a section through another most advantageous embodiment of the thrust control means according to the invention.

Figures 1, 4A:
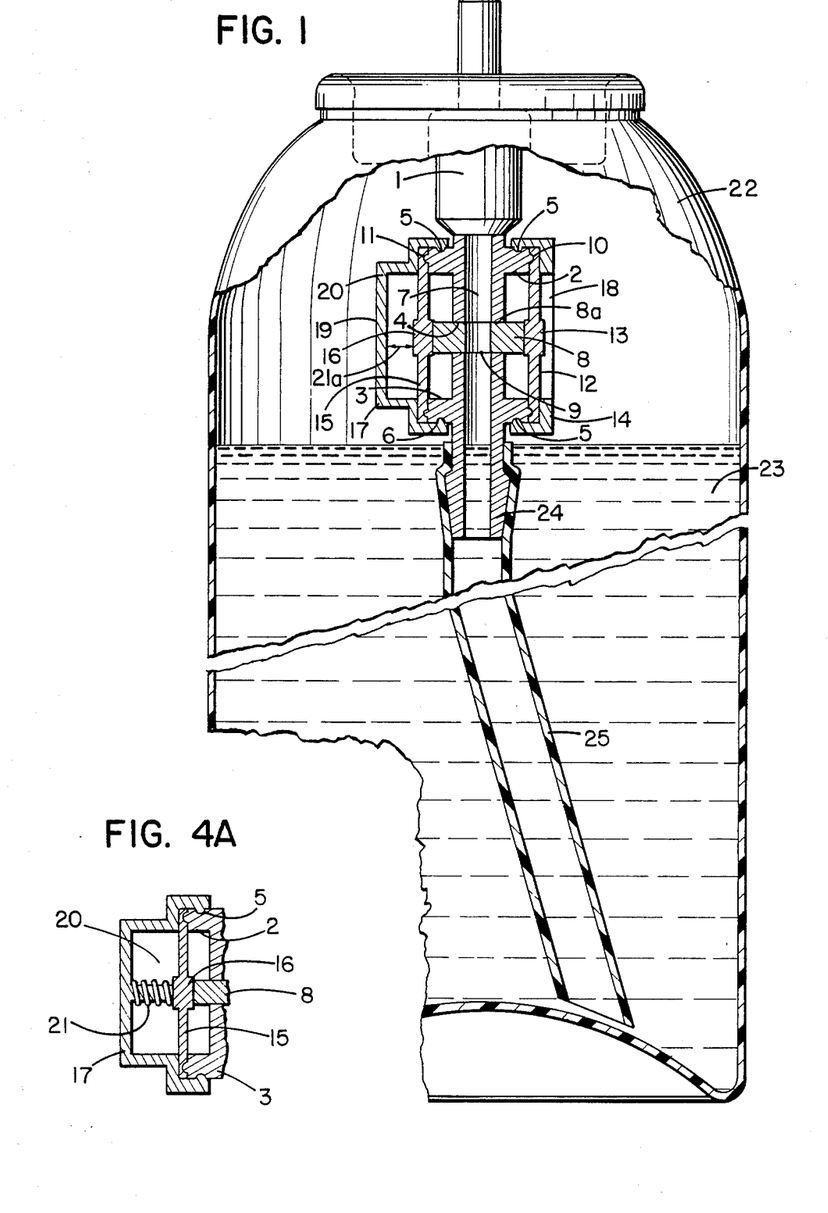
Figures 2, 3, 4:
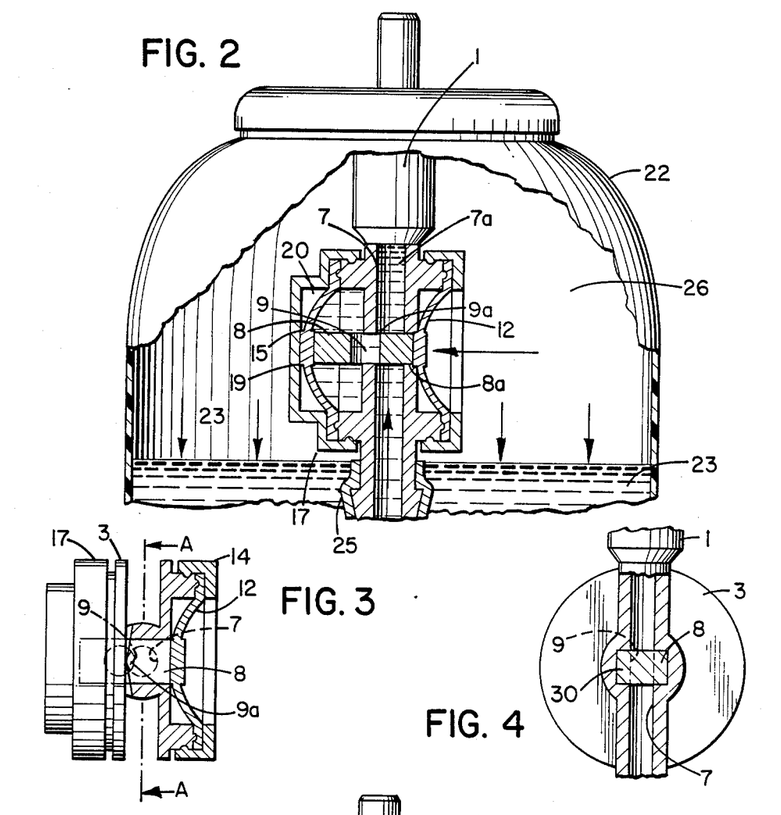

In FIG. 1, one recognizes a conventional valve 1 of a spray can 22 which is provided with an elongation 24 bearing ribs 2 and 3 between which there is provided a transverse bore 4 which extends perpendicularly to a product channel 7 and serves to receive therein a differential piston. The latter bears the gasket 8a and is provided with a bore 9 which is to be found in the axis of the product channel 7 when the device is unpressurized. This rib 2 can be provided with a groove 5, and the rib 3 with a groove 6, which represent part of a spring catch. Furthermore the ribs 2 and 3 can bear annular ribs 10 and 11 on which there are lying the diaphragms 12 and 15 which are firmly connected with the differential piston 8. The diaphragm 12 can be provided at its center with a thickened portion 13, and the diaphragm 15 with a thickened portion 16. Dependent on the container or the product stored therein, respectively, and on the solvents used, these diaphragms can consist of the most varied elastic or at least flexible materials such as Buna, Neopren, Viton, Butyl, Nitril, epichlorohydrin, soft polyethylene or even rustless steel. The piston-and-diaphragm assembly is housed in a casing consisting of a bottom part 17 and a lid 14. The diaphragm 12 is firmly pressed against the rib 2 by means of the lid 14, and the diaphragm 15 can be urged with the bottom part 17 against the rib 3, the spring catches 5 and 6 avoiding a jumping off of the lid 14 and of the bottom part 17. Of course, these can additionally be high frequency welded. The lid 14 is provided with a central opening 18, while the bottom part 17 shields the diaphragm 15, owing to its wall 19, against the pressure prevailing in the container 22, and comprises a hollow interior 20. Depending on the degree of elasticity of the diaphragm 15, one can provide between its thickened portion 16 and the wall 19 a compression spring 21 which urges the diaphragm 15, after a deformation caused by pressure, back into its initial position shown in FIG. 1 (see FIG. 4A). The distance, indicated by the double arrow 21a, between the thickened portion 16 and the wall 19 is so chosen that, when the thickened portion 16 abuts against the wall 19 as shown in FIG. 2, the bore 9 is so far displaced laterally that at least a part 9a of the bore 9 still registers with the channel 7, as illustrated in FIG. 3, so that the latter channel still remains passable albeit barely so. If a compression spring (FIG. 4A) is used, then the distance indicated by the double arrow 21a is larger, corresponding to the used thickness of the wire of the compression spring.

FIG. 1 shows the device according to the invention introduced into a conventional spray can 22, which is filled with a product 23, but without pressure, wherein the valve elongation 24 which contains the product channel 7, is provided in a manner known per se with a riser tube, so that the illustrated unit is ready for introduction of the propellant.

The FIGS. 2 and 3 show the behavior of the thrust control means of the invention under pressure. After the spray nozzle 22 has been filled with the product 23 and closed as illustrated in FIG. 1, one of the mentioned inert gases is introduced in a known manner via the valve 1 and fills the gas space 26 by means of the riser tube 25 via the product 23. The resulting pressure acts on the diaphragm 12 as well as on the surface of the product 23. The differential piston 8 is thereby displaced, by means of the diaphragm 12 which is urged, by the pressure in the container 22 against the former, against the restoring element 15 (diaphragm). Thereby, the bore 9 of the piston 8 is displaced laterally, so that only a part 9a thereof is in communication with the channel 7, the remaining diameter of the latter being closed off by the piston 8. This results in a throttling of the product column 7a, and a reduction, respectively of the column cross section at increased discharge velocity at equal pressure, after the opening of the valve, which corresponds to a diminution of the thrust downstream of the control means. According to known criteria the latter can be built in such a manner that, depending on the initial pressure, the mechanical "break-up" quality of the spray nozzle, the passages of the valve, the viscosity of the product and others, the initial pressure keeps the opening 9a so small that the thrust reduction caused by the throttling produces a sufficient discharge pressure for the spray nozzle, and that, when the pressures acting on the diaphragms 12 and 15 after product discharge become smaller, the opening 9a is so enlarged, i.e. the throttling is so diminished, that, due to enlargement of the surface of the product column in spite of lower pressure, an identical amount of product per unit of time will be atomized by the spray nozzle, so that the spray quality will remain constant at a filled, as well as at a practically emptied product container. This means that, the higher the pressure of the gas space 26, the larger will be the throttling 9a. When this pressure drops, then the elasticities of the diaphragms 12 and 15 or, optionally, of the compression spring (not shown) will bring the bore 9 of the piston 8 continuously into the lumen of the channel 7, whereby the throttling becomes smaller, and the reduced pressure of the product column will be compensated by a larger supply of product, caused by the greater cross sectional area of the product column.

Figure 5:
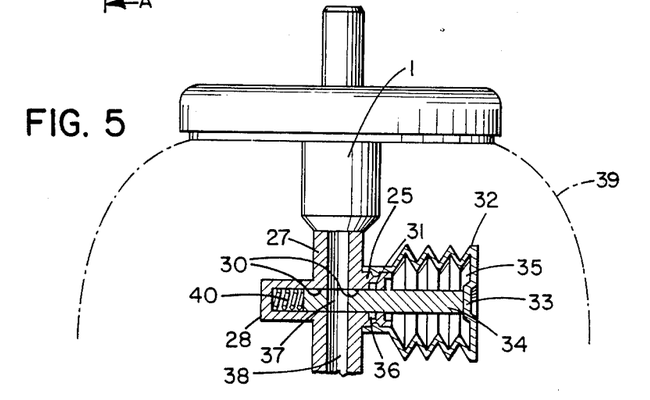

The FIG. 5 shows another advantageous embodiment of the thrust control means according to the invention. A conventional spray can valve 1 is provided with a tubular elongation 27 which bears in cross shape a closed tubulure 28 and an open tubulure 29, which are located opposite each other and possess a common bore 30. The tubulure 29 is provided with a spring catch 31 in which a bellows-like container 32 is snapped in as a counter-piece. This latter has a seat 33 which bears a plunger 34. A hollow space 35 is hermetically sealed off by means of an O-ring 36 which surrounds the piston 34. The piston 34 has a bore 37 which registers with the axis of the valve duct 38 when the container 39 is free from pressure. In the interior of the closed tubulure 28 there is housed a compression spring 40 which supports the piston 34. When the container 39 is pressurized in the manner described hereinbefore, then the hollow space 35 becomes smaller and urges the piston 34 against the compression spring 40, whereby the bore 37 is displaced laterally as shown in FIG. 3. This causes, as described, a throttling of the product column up to the valve, and thus an increase of the flow velocity of the product and simultaneously, due to a decrease of the cross sectional area of the product column, a reduction of pressure. If the container pressure drops, then the compression spring 40 urges the piston anew against the seat 33, the bore 37 again moves into the lumen of the duct 38 whereby the flow velocity becomes smaller, the through-put amount, however, becomes larger, which leads to the thrust, in the direction of flow of a product atomizer disposed downstream of the control means according to the invention, being maintained constant. Thereby, the atomization is reduced, by throttling the product flow at high pressure, to that quality which is attained after throttling ceases, and at lower pressure. In this way, the amount of product discharged per unit of time remains constant during the entire duration of emptying.

Figure 6:
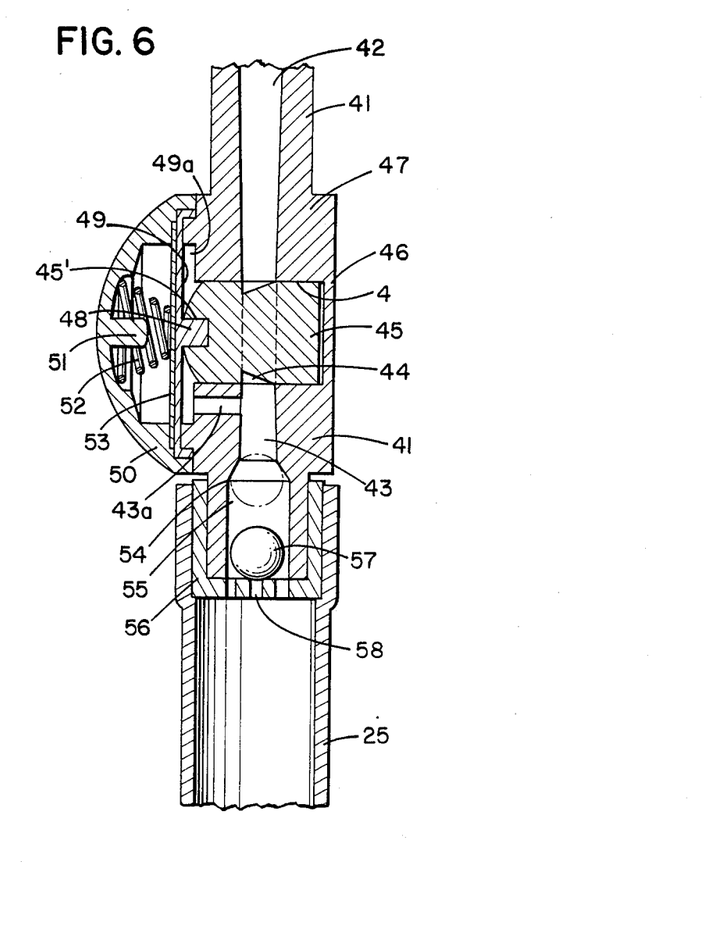

The FIG. 6 shows a further advantageous embodiment of the thrust control means according to the invention, especially for devices from which the user does no longer discharge a product, but only the propellant, holding, for instance, aerosol cans with the valve downwardly. If this concerns a liquefied gas such as Frigen or a propane-butane mixture, this is no grave matter, on the contrary, one often demands of the user this kind of application in order to blow through the spray nozzle in order to avoid clogging of the latter. If, however, the aerosol can is filled with an inert gas such as $CO_2$, $N_2$, $N_2O$ or only with compressed air, which only presses on the product surface, and (expels) the product when opening the valve, whereby there occurs the described pressure drop because the latter does not continuously build up as in the case of a liquid gas, any escape of inert gas must be unconditionally avoided. In the embodiment of FIG. 6 the thrust control means 41 is provided with conical ducts 42 and 43, which are connected via the plunge-cut recess 44 of the differential piston 45. The body 41, having the limiting wall 46 of the body part 47, and the differential piston 45 have been produced from plastics by the injection molding method, preferably from Polyamid 12 which is resistant to all solvents used in aerosol cans and absorbs practically no humidity, and hence cannot swell. The plunge-cut recess 44 is an annular groove. Its cross-sectional area is identical with that of the ducts 42 and 43. The differential piston 45 has been provided axially with the bore 45' in which the pin 48 of the diaphragm 49 is connectingly supported. The diaphragm 49 is preferably manufactured of the same material as the differential piston 45. It is covered by the housing 50 which is provided with a stop 51. Access of pressurized product to the space 49a in front of the diaphragm 49 about the piston 45 is by way of a transverse duct 43a leading to that space 49a from the duct 43. Inside the housing 50 there is found the compression spring 52 which urges the laminated spring 53 against the diaphragm 49. The laminated spring 53 is provided to avoid that the compression spring, in direct contact with the diaphragm 49, would damage the latter which is very thin. During assembly, the diaphragm 49 and the housing 50 are welded on to the body 41 or glued thereon e.g. with formic acid. The differential piston 45 and the diaphragm 49 can also be injection-molded as an integral piece and consist optionally of Teflon, Hytrel or Viton. In this case the stop 51 could be replaced by a pin, located in the center of the diaphragm 49, which abuts against the wall of the housing 50. This pin would then be at the same time the retaining core of the spring 52. One could thus do without the laminated spring 53. The duct 43 is provided with a conical seat 54, whereby the space 55 is obtained. The latter is covered by the cap 56 and contains the ball 57 which rests on the grid-shaped bottom 58. The distance between the grid bottom 58 and the seat 54 is chosen such that neither the liquid nor the gas pressure may urge the ball on to the seat 54, when used as illustrated in FIG. 6. On the other hand, the ball 57 will roll on to its seat 54, as represented in dashed lines, whenever one holds the thrust control means in such a manner that the duct 43 comes to lie above the horizontal plane, so that it is obturated thanks to the ball 57. Thus, if there is a thrust control means according to the invention present in an aerosol can, which contains an inert gas as propellant, and if one tries to actuate the same with the valve downwardly, then thanks to the ball 57 which obturates the duct 43, the escape of inert gases is avoided.

Figure 7:
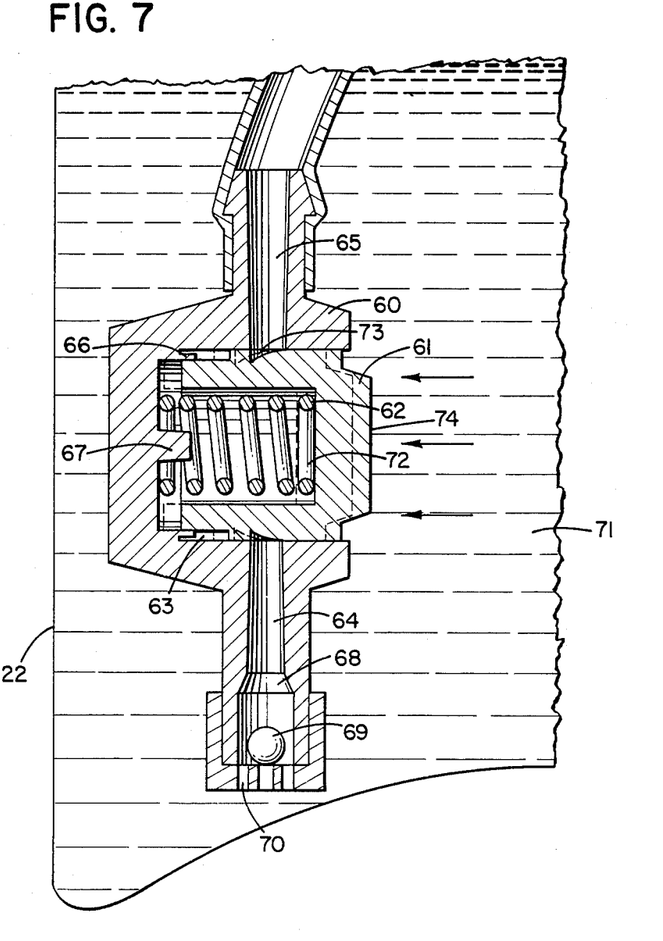

The FIG. 7 shows an extremely advantageous embodiment of a thrust control means according to the invention which is mounted on the free end of a riser tube dipping into a product. The kind of use imposes itself inasmuch as the hermetic sealing between the compression spring chamber and the pressure medium consists of an annular lip which is tight against a pressurized liquid, but might not be tight any more against a gaseous medium, depending on the pressure, whereby it would no longer be possible to attain the desired exact thrust control, because the gas pressure could build up in the compression spring chamber due to a possible leak of the annular lip.

The thrust control means according to the invention consists of the housing 60, the differential piston 61 and the compression spring 62. The housing 60 comprises a chamber 63 into which the duct 64 opens and from which the duct 65 exits. The bottom of the chamber 63 is provided with an annular lip 66 while a pin 67 is provided in its center. The duct 64 has a seat 68 which serves for receiving the ball 69 and bears at its end the perforated sleeve 70 which prevents the ball 69 from dropping out of the duct 64, but permits product 71 to enter. The differential piston 61 is provided with a chamber 72 in which there is lodged a compression spring 62; as shown in FIG. 7 it is unbiassed, which corresponds to the end position of the differential piston 61 when the container 22 is empty of product 71 but still contains a terminal pressure of the inert gaseous medium, so that there exists an unthrottled communication between the duct 64 and the duct 65. When the container is filled with product 71 on the surface of which there acts an inert gas pressure, then the differential piston 61 is urged by the product pressure acting on its wall 74 in the direction of the pin 67 until the compression spring 62 is completely compressed and also serves as a travel stop. In this case, the differential piston 61 occupies the position indicated in dashed lines, so that the plunge-cut recess produces the highest throttling effect. The strength of the compression spring 62 can be of varying magnitude and is dependent on the desired amount of product discharge per unit of time, on the particle size of the atomized product and on the viscosity of the latter. Legal rules of various countries permit, as a lost volume in a container 22, at most 30% of its total filling volume, which means that these 30 percent of lost volume must receive a quantity of gas which affords such a pressure that the latter remains still sufficiently high up to a complete emptying of the product 71, to guarantee the desired quality of atomization. The spray nozzle of the applicant of the instant invention, mentioned hereinbefore, is capable of spraying alcohol-based products, at a mechanical discharge pressure of 3.3 bar, with a particle size of ca. 8 microns, and at a discharge pressure of 1.5 bar, with a particle size of ca. 25 microns. When the alcoholic product is mixed with 35% methylene chloride, then, at a mechanical discharge pressure of 3.3 bar, the particle size is at ca. 5 micron. If, therefore, a hair lacquer, an insecticide or an air frehener is to be sprayed, which for various reasons should evaporate rapidly, i.e., which demand a small particle size, then the initial pressure in a container 22 having a gas space which occupies 30% of the total container volume, must be 11 bar so that the last product of a product 71 is expelled at 3.3 bar, a pressure which is necessary for the demanded spray quality. For other products 71 such as body deodorants, antiperspirants, plant treating agents etc. which need not evaporate so quickly, the initial pressure can be 9.5 bar, which will drop to 2.85 bar during emptying. These data show that the thrust control means according to the invention must contain different strengths in order to meet the respective product conditions. They also show the use of a thrust control means according to the invention is justified, for only thanks to the same is it possible, in spite of the huge pressure drop, to guarantee a constant amount of discharged product per unit of time and an atomization quality which is constant over the entire duration of emptying. If the different categories of products are taken into account which can be stored in a container filled with inert gas, then at least five different expulsion pressure values are obtained which fulfill the diffusion conditions peculiar to the different products. In this case, an atomization need not necessarily be envisioned, for the thrust control means according to the invention also permits the discharge of highly viscous products such as soaps, toothpastes, two-component adhesives, creams, mustard etc. in a constant discharge amount per unit of time. In such cases, the cross sections of the ducts 64 and 65 as well as the plunge-cut recess 73 can be larger than in the case of products to be atomized. The thrust control means according to the invention is adaptable to practically all product diffusion conditions.

Below there are described the pressure values preferably to be used. They lie within the limits of the conventionally used discharge pressure values.

Initial Pressure: 11.0 bar—End pressure: 3.30 bar hair lacquer, insecticides, room air deodorants, highly viscous furniture care agents, dyes, varnishes, highly viscous soaps and toothpastes, two-component adhesives, contact adhesives, medicaments.

Initial Pressure: 9.5 bar—End pressure: 2.85 bar body deodorants, anti-perspirants, hair dryer setting lotions, plant protective agents, medicaments, highly viscous oils (non-atomized), viscous soaps and toothpastes.

Initial Pressure: 8.0 bar—End pressure: 2.40 bar Plant care agents, furniture care agents, antirusting agents, automobile agents, shower soaps, glues, medicaments.

Initial Pressure: 6.5 bar—End pressure: 1.95 bar toilet waters, perfumes, pre-shave lotions, after-shave lotions, body lotions, viscous beauty creams, sugared condensed milk, medicaments, shaving gel, furniture care agents.

Initial Pressure: 5.0 bar—End pressure: 1.50 bar Pre-shave lotions, after-shave lotions, body lotions, window cleaning agents, furniture care agents, mustard, catsup, mayonnaise, cooking oil, technical oils, beauty creams, medicaments, liquid food extracts.

Of course, this list is not complete, but it shows the far-reaching field in which the thrust-control means according to the invention can be used.

Figure 8:
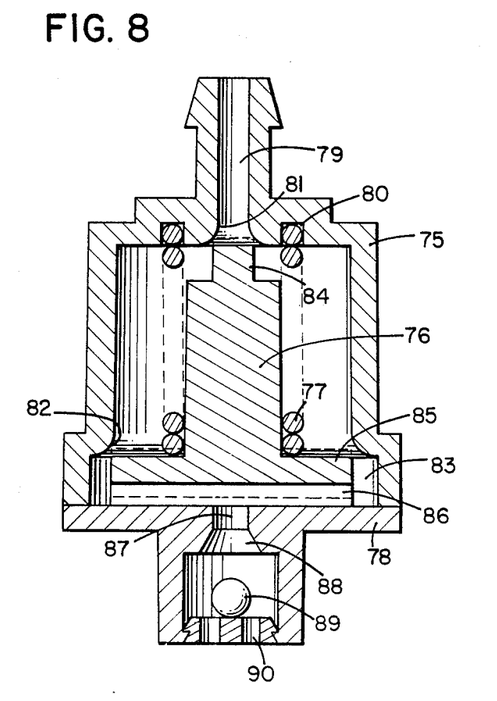

The FIG. 8 shows a section through a further, most advantageous embodiment of the thrust control means according to the invention, which offers great advantages especially with regard to injection molding and assembling techniques. It consists of the housing 75, and differential piston 76, the compression spring 77 and the housing lid 78. The housing 75 comprises a duct 79 and a compression spring seat 80. The entry opening of the duct 79 is of conical shape 81 with exponential curvature. A like conical shape 82 is found at the level of the large housing opening 83. The differential piston 76 is provided at the end thereof turned toward the duct 79 with a pin 84 the diameter of which corresponds to the internal diameter of the cone 81. The other end of the differential piston 76 is provided with a disc 85 the diameter of which corresponds to the internal diameter of the cone 82. The housing lid 78, firmly connected with the housing 75, has in its center the duct 87 and the conical seat 88, which can be closed by the ball 89 lying on the perforated bottom 90. As shown in FIG. 8, the compression spring 77 rests in its seat 80 and urges the differential piston 76 against the housing lid 78. Pressurized product which arrives from the duct 87 can, on the one hand, enter the housing 75 via the groove 86 or, on the other hand, it can so load the differential piston 76, depending on the pressure level, that the compression spring 77, calibrated therefor, is compressed so that the distances between pin 84 and cone 81, as well as disc 85 and cone 82, are diminished in such a way as is represented by the dashed lines, whereby the desired throttling and thus the thrust control are achieved. The throttling at two different locations is necessary because the thrust control means according to the invention is to be made preferably of plastics material, in which case the necessary precision might not be attained, which could have the result that especially the distance between the pin 84 and the cone 81 might become too small, which would lead to complete obturation. It would also cause precisioning problems in the opposite sense if the diameter of the pin 84 would be kept smaller, for one must not forget that a thrust control means according to the invention in this embodiment will have a total diameter of about 10 mm.

The thrust control means according to the invention is, of course, not limited to spray cans but may find an application wherever one wants to guarantee that an amount of discharge per unit of time will remain constant in spite of a pressure drop in a container.

The advantages of the thrust control means according to the invention are evident, as it permits for the first time, especially in aerosol cans, the replacement of the propellants and gas mixtures which are dangerous for the initially mentioned reasons, but exert in a product container an approximately constant pressure on the product to be expelled, even while the rest volume is increasing, by inert, non-dangerous gases or compressed air, and this, be it well-understood, without thereby diminishing the quality of atomization during the emptying process.

Of course, it can also be of advantage that a smaller portion of the product contains as solvent a liquid propellant gas, but instead of about 70% as in the past, only about 10%. As, however, the pressure of the inert gases, or the air pressure, used in the thrust control means according to the invention is higher than the vapor pressure of the liquid propellant gas the latter can never be gasified. It, therefore, remains liquid in the product, mixed with other solvents. Such a mixture may contain, e.g. for technical products, 55% of methylene chloride, 10% if iso-butane and 35% of iso-propane, or for hair lacquer, 35% of methylene chloride, 10% of Frigen 12 and the remainder of alcohol, resins and the like. The advantage resides in that the propellant expelled in the liquid state is drastically detensioned in the air and, in doing so, explodes the other solvent droplets so that an extremely fine spray results, should this be absolutely required.

It is self-evident that the thrust control means according to the invention can be constructed differently in diverse points than has been described at the hand of the illustrated embodiments. This is especially true for the shape given the bores 9 and 37, the plunge-cut recesses 44 and 73 and the cones 81 and 82, which is advantageously so chosen that by the changes of their cross section dependent on pressure changes in a container, and the restoring force of the resetting elements, the conditions for maintaining constant the thrust which acts upon a product column, with an open valve, remain independent of the internal pressure prevailing in the container. In addition, the ducts of the used aerosol valves have at least an equally large diameter as the ducts of the thrust control means according to the invention.

A further essential advantage of the invention resides in that it is so shaped that it can be inserted in the conventional aerosol cans, and on the available machines, so that no jobs will be lost in the existing aerosol industry.

I claim:

1. Thrust control means adapted for being mounted in a pressurized container from the interior of which product is to be expelled along a flowpath extending through a riser tube and a discharge valve, which thrust control means enable maintaining the amount of product being expelled from the container per unit of time at least substantially constant during the entire emptying time of said container, notwithstanding the reduction of internal pressure occuring during the progressive emptying of the container, said thrust control means comprising a casing, a product channel in said casing, having a channel axis and two open ends one of which is connectable to said riser tube and the other is connectable to said discharge valve, a transverse bore having a bore axis intersecting said axis of said product channel, thereby providing two intermediate openings in said product channel located in the wall of said transverse bore, a piston having two ends and a circumferential surface therebetween and being lodged in said transverse bore for axial displacement therein, said piston having a piston bore with two piston bore openings in said circumferential surface of said piston, and with a piston bore axis extending at least substantially parallel with said channel axis, a first diaphragm having two large sides one of which two sides is in working engagement with one of said two piston ends, and resetting means having two sides one of which sides faces toward said diaphragm;

said resetting means holding said piston, in a fully open position in which said piston bore fully registers with said product channel so as to afford a maximum common cross sectional area of said product channel intermediate openings with said piston bore openings, and when said diaphragm is undeformed, and, when said thrust control means is mounted in a container the interior of which is pressurized, one large side of said diaphragm being adapted to be exposed to the internal pressure prevailing in the interior of said container, said diaphragm being deformed by such internal pressure, against the bias of said resetting means, whenever the internal container pressure exceeds a determined upper value, and thereby axially displacing said piston away from said fully open position and reducing the size of said common cross sectional area proportionately with the internal pressure prevailing in said container to which pressure said other diaphragm side is exposed, while, proportionately with the reduction of said internal pressure during gradual emptying of the container, said resetting means will move said piston axially in said transverse bore toward said fully open position, thereby gradually increasing said common cross sectional area as the internal container pressure decreases, the dimensions of said common cross sectional area at fully open position and the deformability of said diaphragm with changing pressure being so chosen that the size of the internal container pressure, prevailing at a given time, multiplied by the size of the respective common cross sectional area at that pressure affords an at least substantially constant value throughout all of the operations required for emptying the container of product.

2. The thrust control means of claim 1, wherein said transverse bore as well as said piston have out of round cross sectional configurations, thereby preventing said piston from turning in said bore.

3. The thrust control means of claim 1, wherein said resetting means is a second diaphragm.

4. The thrust control means of claim 1, wherein said resetting means is a spring.

5. The thrust control means of claim 1, wherein said first diaphragm consists of a disc of elastic material selected from Buna, Nitril, Neopren, Butyl and epichlorohydrin.

6. The thrust control means of claim 1, further comprising a body containing said product channel and a lid having an opening and being fastened on said body clamping in said first diaphragm so as to hold the same in engagement with said piston.

7. The thrust control means of claim 1, further comprising a casing body containing said product channel and having a wall portion projecting on the side of said body turned away from said first diaphragm and enclosing a chamber for housing said resetting means therein and shielding the same from the internal container pressure.

8. The thrust control means of claim 1, wherein said resetting means is mechanically connected to said piston.

9. The thrust control means of claim 7, wherein said resetting means comprises a spring which is supported on said wall portion enclosing said chamber and a second diaphragm biassing said piston toward said fully open position.

10. The thrust control means of claim 9, wherein said second diaphragm is mechanically connected to said piston.

11. The thrust control means of claim 1, further comprising a ball valve disposed in said riser tube.

12. The thrust control means of claim 7, wherein said riser tube is integral with said casing body, and comprises a ball valve therein.

13. The thrust control means of claim 7, wherein said body containing the product channel, and said lid are made essentially of synthetic plastics resin material.

14. In an aerosol spray can having a discharge valve and a spray head, the improvement of, in combination, a thrust control means as defined in claim 1 being attached to said discharge valve in the interior of said can, a filling in said can comprising an atomizable product and, as propellant acting upon the product, an inert gas, and the pressure in said can when in maximally filled condition amounting to five to eight bar, and when in a state empty of product, from one to four bar.

15. The improvement of claim 14, wherein said inert gas is selected from $CO_2$, $N_2$, $N_2O$ or compressed air.

16. The thrust control means of claim 1, wherein said diaphragm is in working engagement with one end of said piston and said resetting means is in working engagement with the other piston end, said diaphragm side adapted to being exposed to said internal pressure facing away from said piston.

17. The thrust control means of claim 1, wherein the same side of said diaphragm which is adapted to be exposed to internal container pressure, is in working engagement with one end of said piston, and said resetting means are housed in said casing on, and are in working engagement with, the other one of said large sides of said diaphragm which other side faces away from said piston and is protected by said casing from said internal pressure acting thereon.

* * * * *